United States Patent
Borisov et al.

(10) Patent No.: US 6,671,302 B2
(45) Date of Patent: Dec. 30, 2003

(54) DEVICE FOR SELF-INITIATED UV PRE-IONIZATION OF A REPETITIVELY PULSED GAS LASER

(75) Inventors: Vladimir Mikhailovich Borisov, Troitsk (RU); Alexander Yurivich Vinokhodov, Troitsk (RU); Vladimir Alexeevich Vodchits, Troitsk (RU)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/922,241

(22) Filed: Aug. 2, 2001

(65) Prior Publication Data

US 2002/0041615 A1 Apr. 11, 2002

Related U.S. Application Data

(60) Provisional application No. 60/224,865, filed on Aug. 11, 2000.

(51) Int. Cl.[7] .................. H01S 3/00; H01S 3/223; H01S 3/097; H01S 3/09
(52) U.S. Cl. .................. 372/55; 372/38.02; 372/38.05; 372/57; 372/86; 372/87; 372/90
(58) Field of Search .................. 372/55, 57, 38.02, 372/38.04, 38.05, 86, 87, 88, 90

(56) References Cited

U.S. PATENT DOCUMENTS

| | | | |
|---|---|---|---|
| 4,105,952 A | 8/1978 | Tulip .................. 331/94.5 PE |
| 4,240,044 A | 12/1980 | Fahlen et al. .......... 331/94.5 PE |
| 4,287,483 A | 9/1981 | Rudko et al. .............. 331/94.5 |
| 4,365,337 A | 12/1982 | Cirkel et al. .................. 372/87 |
| 4,380,079 A | 4/1983 | Cohn et al. .................. 372/87 |
| 4,429,392 A | 1/1984 | Yoshida et al. ................ 372/9 |
| 4,491,949 A | 1/1985 | Beck et al. .................. 372/86 |
| 4,498,183 A | 2/1985 | Levatter .................. 372/86 |
| 4,507,266 A | 3/1985 | Satoh et al. ........... 422/186.15 |
| 4,542,529 A | 9/1985 | Pace et al. .................. 372/86 |

(List continued on next page.)

FOREIGN PATENT DOCUMENTS

| | | | |
|---|---|---|---|
| DE | 2050 490 | 4/1972 | ............ D01H/1/10 |
| DE | 29 32 781 | 2/1981 | ............ H01S/3/097 |
| DE | 30 35730 A1 | 5/1982 | ............ H01S/3/03 |
| DE | 33 13811 A1 | 10/1984 | ............ H01S/3/097 |
| DE | 295 21572 U1 | 11/1997 | ............ H01S/3/038 |

(List continued on next page.)

OTHER PUBLICATIONS

A.S. Bashkin, et al., "High Power 1 $\mu$sec Ultraviolet Radiation Source for Pumping of Gas Lasers," *Sov. J. of Quantum Electronics*, vol. 6, No. 8, Aug. 1976, pp. 994–996.

(List continued on next page.)

*Primary Examiner*—Paul Ip
*Assistant Examiner*—Armando Rodriguez
(74) *Attorney, Agent, or Firm*—Stallman & Pollock LLP

(57) ABSTRACT

A device for use with a repetitively pulsed gas laser provides self-initiated UV preliminary ionization of the active volume of a laser, which has extended high-voltage and grounded electrodes disposed parallel to one another, to which peaking capacitors distributed along the length of the electrodes are connected in a low-inductance manner. The low-voltage contacts of the peaking capacitors are either connected directly to the grounded electrode or, if this connection is interrupted, dielectric plates are inserted that are disposed either on one side or on both sides of the grounded electrode. If the capacitors are charged rapidly, a surface discharge which effects UV pre-ionization of the volume of the main discharge and is uniformly distributed over the whole surface of the dielectric plates is produced on the surface of the dielectric plates. The device provides improved output parameters of the laser and increased service life both of the gas mixture and of structural components of the electric discharge system.

13 Claims, 2 Drawing Sheets

U.S. PATENT DOCUMENTS

| | | | |
|---|---|---|---|
| 4,594,721 A | * | 6/1986 | Penco et al. .................... 372/88 |
| 4,613,971 A | | 9/1986 | Brumme et al. .............. 372/87 |
| 4,679,203 A | | 7/1987 | Taylor et al. .................. 372/86 |
| 4,718,072 A | | 1/1988 | Marchetti et al. ............. 372/86 |
| 4,719,637 A | | 1/1988 | Cavaioli et al. ............... 372/59 |
| 4,823,354 A | | 4/1989 | Znotins et al. ................. 372/59 |
| 4,953,174 A | | 8/1990 | Eldridge et al. .............. 372/87 |
| 4,975,921 A | | 12/1990 | Rothe .......................... 372/38 |
| 5,042,047 A | | 8/1991 | Ono et al. ..................... 372/86 |
| 5,048,045 A | * | 9/1991 | Noda et al. .................... 372/86 |
| 5,081,638 A | | 1/1992 | Gallant et al. ................. 372/86 |
| 5,090,020 A | | 2/1992 | Bedwell ....................... 372/59 |
| 5,138,622 A | | 8/1992 | Friede et al. .................. 372/38 |
| 5,138,627 A | | 8/1992 | Friede et al. .................. 372/38 |
| 5,142,166 A | | 8/1992 | Birx ........................... 307/419 |
| 5,187,716 A | | 2/1993 | Haruta et al. .................. 372/57 |
| 5,225,884 A | | 7/1993 | Stark et al. .................... 356/73 |
| 5,247,391 A | | 9/1993 | Gormley ..................... 359/601 |
| 5,247,531 A | * | 9/1993 | Muller-Horsche ............ 372/38 |
| 5,247,534 A | * | 9/1993 | Muller-Horsche ............ 372/58 |
| 5,247,535 A | | 9/1993 | Muller-Horsche et al. .... 372/86 |
| 5,267,253 A | | 11/1993 | Nakatani ...................... 372/38 |
| 5,305,339 A | | 4/1994 | Nakatani et al. .............. 372/38 |
| 5,309,462 A | * | 5/1994 | Taylor et al. .................. 372/38 |
| 5,337,330 A | | 8/1994 | Larson ......................... 372/86 |
| 5,347,531 A | | 9/1994 | Nakatani et al. .............. 372/86 |
| 5,708,676 A | | 1/1998 | Minamitani et al. .......... 372/86 |
| 5,729,562 A | | 3/1998 | Birx et al. ..................... 372/38 |
| 5,818,865 A | | 10/1998 | Watson et al. ................. 372/86 |
| 5,852,621 A | | 12/1998 | Sandstrom ................... 372/65 |
| 5,875,207 A | | 2/1999 | Osmanow .................... 372/86 |
| 5,897,847 A | | 4/1999 | Jursich et al. .............. 423/219 |
| 5,914,974 A | | 6/1999 | Partlo et al. ................... 372/38 |
| 5,923,693 A | | 7/1999 | Ohmi et al. ................... 372/57 |
| 5,936,988 A | | 8/1999 | Partlo et al. ................... 372/38 |
| 5,940,421 A | | 8/1999 | Partlo et al. ................... 372/38 |
| 5,949,806 A | | 9/1999 | Ness et al. .................... 372/38 |
| 5,970,082 A | | 10/1999 | Ershov ....................... 372/102 |
| 5,982,795 A | | 11/1999 | Rothweil et al. ............. 372/38 |
| 5,982,800 A | | 11/1999 | Ishihara et al. ............... 372/57 |
| 5,991,324 A | | 11/1999 | Knowles et al. .............. 372/57 |
| 6,005,880 A | | 12/1999 | Basting et al. ................ 372/38 |
| 6,020,723 A | | 2/2000 | Desor et al. ................. 320/166 |
| 6,021,150 A | | 2/2000 | Partio et al. ................... 372/57 |
| 6,023,486 A | | 2/2000 | Hofmann et al. ............. 372/58 |
| 6,026,103 A | | 2/2000 | Oliver et al. .................. 372/37 |
| 6,028,872 A | | 2/2000 | Partlo et al. ................... 372/38 |
| 6,028,880 A | | 2/2000 | Carlesi et al. ................. 372/58 |
| 6,034,978 A | | 3/2000 | Ujazdowski et al. .......... 372/34 |
| 6,034,984 A | | 3/2000 | Hofmann et al. ............. 372/58 |
| 6,240,110 B1 | | 5/2001 | Ershov ......................... 372/20 |
| 6,456,643 B1 | | 9/2002 | Osmanow et al. ............ 372/86 |
| 2001/0036216 A1 | | 11/2001 | Bragin et al. ................. 372/55 |
| 2002/0041615 A1 | | 4/2002 | Borisov et al. ............... 372/57 |

FOREIGN PATENT DOCUMENTS

| | | | | |
|---|---|---|---|---|
| EP | 0 532 751 A1 | 2/1991 | ........... | H01S/3/038 |
| EP | 0 426 993 B1 | 12/1993 | ........... | H01S/3/038 |
| EP | 1 075 059 A1 | 2/2001 | ........ | H01S/3/0971 |
| EP | 1 107 401 A1 | 6/2001 | ........... | H01S/3/038 |
| JP | 63-86593 | 4/1988 | ........... | H01S/3/134 |
| JP | 3-9582 | 6/1989 | ........... | H01S/3/038 |

OTHER PUBLICATIONS

K. Hohla, et al., "CIF and F2: Two–ultraviolet Laser Systems," *Optics and Laser Technology*, Dec. 1979, vol. 11, No. 6., pp. 281–328.

R. Marchetti et al., "A New Type of Corona–discharge Photoionization Source for Gas Lasers," *Journal of Applied Physics*, Dec. 31, 1985, vol. 56, No. 11., pp. 3163–3168.

R.S. Taylor et al., "Pre–ionization of a Long Optical Pulse Magnetic–spike Sustainer XeCl Laser," *Review of Scientific Instruments, American Institute of Physics*, Dec. 1994, vol. 65, No. 12, pp. 3621–3627.

Tatsuo Enami et al., "High Spectral Purity and High Durability kHz KrF Excimer Laser with Advanced RF Pre–ionization Discharge," *Proceedings of SPIE, Optical Microlithography XI*, Feb. 25–27, 1998, vol. 3334, pp. 1031–1040.

Article in Russian Language: Journal of Technical Physics, vol 49, No. 6, pp. 1241–1244.

Lambda Physik Booklet: "Instruction for Mounting the Brewster's Window EMG 67 or Unstable Resonator Kit EMG 70," printed 1/82, 27 pages.

Raymond A. DeCarlo, Linear Circuit Analysis, Chapter 9: Second–Order Linear Circuits, pp. 258.

U.S. patent application No. 09/247,887, Igor Bragin, et al., filed Feb. 10, 1999.

U.S. patent application No. 09/692,265, Igor Bragin, et al., filed Oct. 19, 2000.

* cited by examiner

DEVICE FOR SELF-INITIATED UV PRE-IONIZATION OF A REPETITIVELY PULSED GAS LASER

PRIORITY

This application claims the benefit of priority to U.S. provisional patent application No. 60/224,865, filed Aug. 11, 2000.

BACKGROUND OF THE INVENTION

1. Field of the Invention

The invention relates to the field of quantum electronics and to repetitively pulsed gas lasers having a transverse self-maintained discharge and UV pre-ionization.

2. Discussion of the Related Art

The energy stability of a gas discharge laser such as an excimer laser is strongly influenced by the strength and uniformity of the preionization of the laser gas within the discharge volume. The "preionization" of the laser gas corresponds to the initial electron concentration in the discharge volume at the initial stage of the discharge sequence. There have been developed several types of preionization devices and methods for generating short wavelength UV radiation that interacts with the laser gas in the discharge volume.

One type of UV preionization system that is used in gas lasers typically provides self-maintained discharges from a number of spark sources disposed near one or both electrodes on one or both sides of them (see, e.g., V. Yu. Baranov, V. M. Borisov and Yu. Yu. Stepanov, "Elektrorazryadnye eksimernye lazery na galogenidakh inertnykh gazov" (Electric discharge excimer lasers based on the halides of inert gases"), Energoatomizdat, 1988; and see U.S. Pat. Nos. 4,105,952, 4,980,894, 4,951,295, 4,797,888, 5,347,532 and 4,287,483, which are hereby incorporated by reference). FIG. 1 illustrates an electric discharge circuit (e.g., capacitor discharging circuit) of a gas laser having spark UV pre-ionization, comprising a high-voltage electrode 1, a grounded electrode 2, a storage capacitor 3 and a peaking capacitance 4, a commutator (thyratron) 5, and one to four rows of UV-pre-ionization spark sources 6. In such a circuit, the number of spark sources in each row is discrete and their maximum number is typically determined by the number of peaking capacitors used top provide the peaking capacitance 4.

The spark UV pre-ionizer operates as follows. The storage capacitor 3 is charged up from the high-voltage supply source to the voltage $U_0$, and after the thyratron has fired, the peaking capacitors are discharged via the spark gap 6. The UV pre-ionization provides a substantial concentration of starter electrons for producing a volume discharge in the interelectrode gap between the electrodes 1 and 2. When the laser is operating in repetitively pulsed mode, the induced gas flow ejects, during the time between the pulses, a plug of heated gas, formed from the main discharge and the spark sources of the preceding pulse and containing products of the plasma-chemical reaction, from the main discharge zone.

Disadvantages of UV-pre-ionization spark systems include the following. Since the number of spark gaps is discrete and generally limited by the finite dimensions of the peaking capacitors, the distribution of the concentration of starter electrons in the main discharge zone will be modulated over the length of the electrodes, thereby reducing the active volume of the laser and, consequently, its output characteristics. This is particularly undesirable in short-wave excimer lasers (e.g., KrF and ArF lasers) and molecular fluorine lasers (i.e., $F_2$ lasers), in which, due to strong photoabsorption of the pre-ionizing radiation, spark sources are typically disposed as near as possible to the main discharge zone.

Another significant disadvantage of the UV-pre-ionization spark system is erosion of the spark source electrodes, which, in the first place, severely contaminates the gas volume and, in the second place, is responsible for a relatively short service life of these spark gap electrodes. In addition, the space modulation of the level of pre-ionization results in the same modulation of the main discharge, which contributes to uneven erosion of the main laser electrodes. Yet another disadvantage of this system of pre-ionization is the complexity of varying the energy passing through the pre-ionizer without changing the total capacity of the peaking capacitors. A significant disadvantage of spark pre-ionization is also the fact that the spark sources form plasma reaction products, and fluctuations in the gas flow which are injected by the gas flow into the inter-electrode region when the laser is operating in repetitively pulsed mode at the instant of the succeeding discharge pulses, which limits the maximum pulse repetition frequency.

Among the various preionization techniques is another technique known as sliding surface discharge preionization (see, e.g., German Gebraushmuster DE 295 21 572 and U.S. Pat. Nos. 5,081,638 and 5,875,207, and U.S. patent application Ser. No. 09/532,276, which is assigned to the same assignee as the present application, each patent reference of which is hereby incorporated by reference), and an additional technique known as corona discharge preionization (see U.S. patent application Ser. Nos. 09/247,887 and 09/692,265, which are assigned to the same assignee as the present application, U.S. Pat. No. 5,247,531, and German patents no. DE 3035730, 3313811, 2932781, and 2050490, all of which are hereby incorporated by reference).

The sliding surface discharge, e.g., according to DE 29521572 and U.S. Pat. No. 5,875,207, each mentioned above, is an efficient and promising method for the preionization of the excimer and molecular fluorine laser gas media. It is a type of discharge at the surface of a dielectric medium. The surface discharge provides radiation in the UV and VUV spectral range down to a wavelength $\lambda=2$ nm at a plasma temperature in the discharge of up to $3\times10^{4\circ}$ K. (see also Bagen B., Arbeitsbr. Ins. Plasma Phys., Julisch 1963, pp. 631–34, which is hereby incorporated by reference).

The '638 patent, mentioned above, and referring specifically to FIGS. 4a and 4b therein, describes a sliding surface discharge preionization arrangement wherein insulating material is positioned between preionization pins to bridge the gap between the pins. The insulating material provides a "tracking surface" for a preionization discharge. An advantage of the arrangement according to the '638 patent is the minimization of wear on the electrode pins, which is typically a problem with conventional spark gap preionizer arrangements, as mentioned above. The voltage needed to drive a sliding surface discharge is less than that needed for dielectric breakdown of the gas between the pins. An additional advantage is that significant output laser parameters such as energy stability are more stable for excimer and molecular fluorine lasers having sliding surface discharge preionizers than those having spark preionizers, and longer dynamic gas lifetimes for excimer and molecular fluorine lasers are achievable.

It is desired to provide an improved gas discharge laser system, such as an excimer or molecular fluorine laser system, by providing an improved UV pre-ionization laser source which is based on discharge over the surface of a dielectric. It is therefore an object of the invention to provide a self-initiated, efficient, low-current, spatially uniform UV pre-ionization, which provides high laser output parameters and a long service life both of the gas mixture and of the structural components of the electric discharge system relative to those provided by spark UV pre-ionization, and which is advantageous in view of known sliding surface discharge devices such as those set forth at U.S. Pat. Nos. 5,081,638 and 5,875,207, and german Gebrauchmuster DE 295 21 572 U1.

SUMMARY OF THE INVENTION

In accordance with this object and in view of above background discussion, an excimer or molecular fluorine laser is provided including a discharge chamber filled with a gas mixture at least including a halogen-containing species and a buffer gas, a pair of elongated main discharge electrodes within the discharge chamber for forming a discharge therebetween, a sliding surface preionization unit within the discharge chamber including an elongated dielectric plate, a discharge circuit for supplying electrical pulses to the main discharge electrodes to energize the gas mixture and a resonator for generating a laser beam. The discharge circuit further includes a peaking capacitance connected between the main discharge electrodes and a preionization capacitance less than the peaking capacitance connected to the sliding surface preionization unit.

A device intended for self-initiated UV pre-ionization of an active volume of an electric discharge repetitively pulsed gas laser is also provided including an electrode system having capacitors connected to it, wherein, in order to improve output characteristics of the laser and the service life of the gas mixture, to reduce the contamination of the gas cavity and to increase the service life of components of the laser electric discharge system, UV pre-ionization of the active volume is effected by UV irradiation from a discharge over a surface of at least one dielectric plate, which discharge is produced during charging of peaking capacitors proceeding from a low-voltage lead end, which plate is disposed near and on one side of a grounded main discharge electrode relative to a discharge region of the laser.

A device intended for self-initiated UV pre-ionization of an active volume of an electric discharge repetitively pulsed gas laser is further provided including an electrode system having capacitors connected to it, wherein, in order to improve output characteristics of the laser and the service life of the gas mixture, to reduce the contamination of the gas cavity and to increase the service life of components of the laser electric discharge system, UV pre-ionization of the active volume is effected by UV irradiation from a discharge over a surface of at least one dielectric plate, which discharge is produced during charging of peaking capacitors proceeding from a low-voltage lead end, wherein, as a result of the discharge over the surface of the dielectric, only a small proportion of the peaking capacitors is charged, while the remainder are connected to the grounded electrode without having the dielectric plate connected therebetween.

INCORPORATION BY REFERENCE

What follows is a cite list of references which are, in addition to those references cited above in the background section and the background and invention summary sections themselves, hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

V. Yu. Baranov, V. M. Borisov and Yu.Yu. Stepanov, "Elektrorazryadnye eksimernye lazery na galogenidakh inertnykh gazov" (Electric discharge excimer lasers based on the halides of inert gases"), Energoatomizdat, 1988;

Bagen B., Arbeitsbr. Ins. Plasma Phys., Julisch 1963, pp. 631–34;

German patent documents no. DE 29521572 DE 3035730, DE 3313811, DE 2932781 and DE 2050490;

U.S. Pat. Nos. 5,081,638, 5,875,207, 5,247,531, 4,105, 952, 4,287,483, 4,980,894, 4,951,295, 4,797,888, 5,347,532, 5,337,330, 5,719,896 and 5,991,324; and U.S. patent application Ser. Nos. 09/247,887, 09/532,276, 09/692,265, 09/587,996, 09/513,025 and 09/453,670, which are assigned to the same assignee as the present application.

DETAILED DESCRIPTION OF THE PREFERRED EMBODIMENTS

The preferred embodiments relate to the field of quantum electronics and to repetitively pulsed gas lasers having a transverse self-maintained discharge. The device is used to effect self-initiated UV preliminary ionization of the active volume of a laser, which has extended high-voltage and grounded electrodes, disposed parallel to one another, to which peaking capacitors distributed along the length of the electrodes are connected in a low-inductance manner. The low-voltage contacts of the peaking capacitors are either connected directly to the grounded electrode or, if this connection is interrupted, dielectric plates are inserted that are disposed either on one side or on both sides of the grounded electrode. If the capacitors are charged rapidly, a surface discharge which effects UV pre-ionization of the volume of the main discharge and is uniformly distributed over the whole surface of the dielectric plates is produced on the surface of the dielectric plates. Compared with the generally accepted spark UV pre-ionization, the use of UV pre-ionization by a discharge over the surface of the dielectric makes it possible to improve output parameters of the laser and to increase the service life both of the gas mixture and of the structural components of the electric discharge system.

Figure 2:
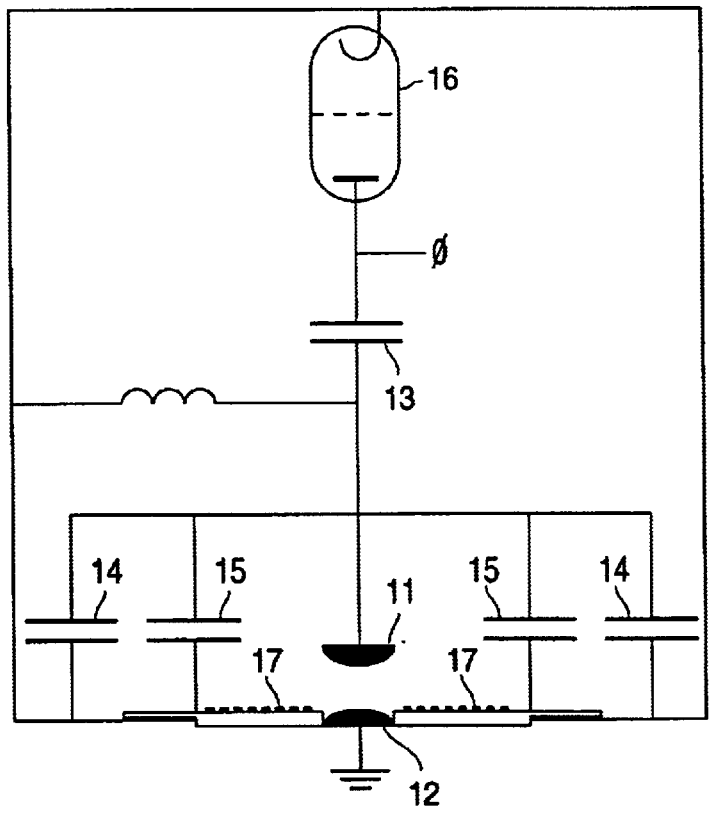
FIG. 2 schematically illustrates a discharge circuit for a gas laser including a sliding surface discharge preionization system according to a preferred embodiment.

An excimer or molecular fluorine laser according to a preferred embodiment generally includes a discharge chamber filled with a gas mixture at least including a halogen-containing species and a buffer gas, a pair of elongated main discharge electrodes within the discharge chamber for forming a discharge therebetween, a sliding surface preionization unit within the discharge chamber including an elongated dielectric plate, a discharge circuit for supplying electrical pulses to the main discharge electrodes to energize the gas mixture and a resonator for generating a laser beam. General features of the preferred excimer or molecular fluorine laser system are descirbed is more detail below with reference to FIG. 3. Referring now particularly to FIG. 2, the preferred discharge circuit further includes a peaking capacitance 14 connected between the main discharge electrodes 11 and 12 and a preionization capacitance 15 less than the peaking capacitance 14 connected to the sliding surface preionization unit including the dielectric plate 17.

Although not shown in FIG. 2, the dielectric plate 17 is elongated into and/or out of the plane of FIG. 2. The plate 17 may be as long as or longer than the main electrodes 11 and 12. Additionally with respect to FIG. 2, the main electrodes 11 and 12 are elongated into and/or out of the plane of the page. The peaking and preionization capacitances 14 and 15, respectively, are also preferably provided by series of capacitors spread along the elongated direction of the electrodes 11 and 12 and the plate 17.

The dielectric plate 17 may be preferably oriented with a cross-sectional long axis between substantially 30° and 90° (the plate 17 is shown oriented at 90°) relative to a direction of the discharge. The dielectric plate 17 is generally oriented with a cross-sectional long axis at an angle relative to a direction of the discharge preferably not less than an angle between the direction of the discharge and a gas flow direction of gas entering a discharge region between the main discharge electrodes. The dielectric plate may be oriented with a cross-sectional long axis substantially perpendicular to (or at 90° to) a direction of the discharge.

The dielectric plate 17 is preferably disposed adjacent and proximate to one of the main discharge electrodes 11 and 12, preferably the grounded electrode 12, as shown. The dielectric plate 17 may be mechanically contacting this electrode 12 or may be electrically connected to the electrode 12 by an electrically conducting conduit. As shown, a cross-sectional long axis end of the plate 17 is preferably disposed proximate to one of the main discharge electrodes 12, and may be mechanically contacting the electrode 12. Other geometries of the sliding surface preionization unit and orientations of the dielectric plate 17 are possible, such as disposing the dielectric substantially parallel to the discharge, providing a sliding surface which substantially faces the discharge, or an "L"-shaped geometry, e.g., for feeding the electrodes of the preionization assembly through the top of the discharge chamber while providing a sliding surface that faces the discharge, or otherwise such as may be described at U.S. Pat. No. 5,875,207 and U.S. patent application Ser. No. 09/532,276, which is assigned to the same assignee as the present application, each patent reference of which is hereby incorporated by reference.

The peaking capacitance 14 may be connected between the main electrodes 11 and 12 without having the sliding surface preionization unit connected between the peaking capacitance 14 and either of the main electrodes 11 and 12. The preionization capacitance 15 is connected between one of the main electrodes 11 and 12 (e.g., the HV main electrode 11, as shown in FIG. 2) and the sliding surface preionization unit including the dielectric plate 17. That is, the sliding surface preionization unit including the dielectric plate 17 is preferably connected between the preionization capacitance 15 and the grounded main electrode 12. The preionization capacitance 15 may be preferably provided by one or more preionization capacitors of a different size than peaking capacitors which provide the peaking capacitance 14. The peaking capacitance 14 may in fact include the preionization capacitance 15 through the sliding surface preionization unit including dielectric plate 17.

The device of the preferred embodiment provides self-initiated UV pre-ionization of an active volume of an electric discharge repetitively pulsed gas laser. The electrode system has capacitors connected to it for providing the peaking and preionization capacitances 14 and 15, respectively, wherein, in order to improve the output characteristics of the laser and the service life of the gas mixture, to reduce the contamination of the gas cavity and to increase the service life of components of the laser electric discharge system, UV pre-ionization of the active volume is effected by UV irradiation from a discharge over a surface of at least one dielectric plate 17. The discharge is produced during charging of capacitors proceeding from a low-voltage lead end, which plate is disposed near and on one side of a grounded main discharge electrode 12 relative to a discharge region of the laser. As a result of the discharge over the surface of the dielectric plate 17, only a small proportion of the peaking capacitors 14 is charged (e.g., capacitors 15), while the remainder of the capacitors 14 are connected to the grounded electrode 12 without having the dielectric plate 17 connected therebetween. The laser is preferably configured with a narrow-aperture of not more than 5 mm (i.e., discharge width) and having a high pulse repetition frequency of at least 2 kHz, and the discharge over the surface of the dielectric 17 may be disposed on one side of the grounded electrode.

Figure 1:
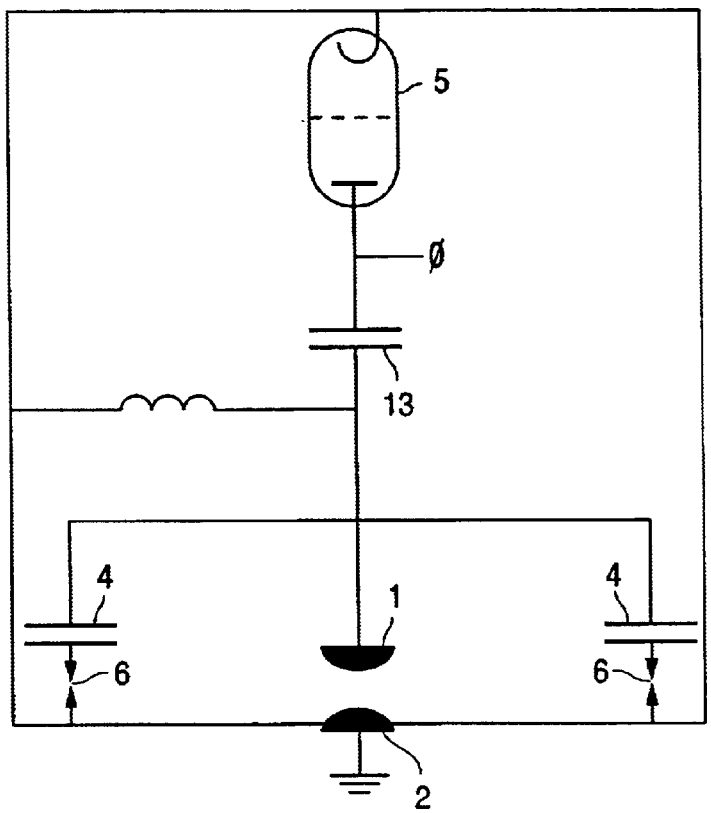
FIG. 1 schematically illustrates a discharge circuit for a gas laser including a spark gap discharge preionization system.

Referring more specifically to the schematic diagram of FIG. 2, a similar electric discharge circuit as in the case of spark pre-ionization (see FIG. 1) for capacitive recharging is shown, except with UV pre-ionization due to a discharge over the surface of a dielectric plate 17 according to a preferred embodiment. The schematic of FIG. 2 includes a high-voltage electrode 11, a grounded electrode 12, a storage capacitor 13, a peaking capacitance 14 and a pre-ionization capacitance 15, a commutator (e.g., thyratron or solid state switch) 16 and at least one dielectric plate 17 (two plates 17 are shown). Most suitable as a preferred material for the dielectric plate is monocrystalline sapphire, and alternatives includes polycrystalline alumina ($Al_2O_3$), BaTiO, $BaTiO_3$/$SrTiO_3$, $BaTiO_3$/$ZrO_3$ and $ZrO_3$. As a result of the steep leading edge of the increase in voltage across capacitors 13 and 14 ($>10^{11}$ V/sec) in the electrical discharge circuit shown in FIG. 2, the charging of the capacitors 14 takes place through the discharge, which is uniformly distributed over the surface of the dielectric plates 17 and which effects a pre-ionization of the active volume of the laser, which pre-ionization is uniform over the length of the electrodes 11 and 12. The pre-ionization capacitance 15 is preferably at the same time part of the peaking capacitance 14, i.e., wherein the size of the capacitors which provide the preionization capacitance 15 may be varied, thereby altering the magnitude of the energy pumped through the sliding surface pre-ionizer and preferably minimizing this energy, while providing sufficient preionization, without substantially impairing output parameters of the laser.

As experimental studies have shown, even in those gas lasers, such as excimer lasers (KrF, ArF) or molecular fluorine lasers ($F_2$), in which the requirements imposed on the level of pre-ionization are typically stricter, the use of the preferred UV pre-ionization device makes it possible advantageously to decrease the energy pumped through the pre-ionizer by a factor of up to 50 or more, which sharply reduces the formation of dust in the gas cavity of the laser, while at the same time the output parameters of these lasers (energy, mean power, generating stability, lifetime of the gas mixture) are improved.

In addition owing to the small size and uniform spatial distribution of the energy pumped through the preferred pre-ionizer, and also its disposition in the discharge chamber, its influence in the repetitively pulsed mode on the shaping of subsequent discharge pulses will be reduced. This feature of the preferred system herein contributes to the achievement of a higher maximum pulse repetition frequency than in the case of spark pre-ionization at a same gas flow velocity. In particular, in one and the same electric discharge system, the replacement of spark pre-ionization with pre-ionization by a discharge over the surface of the dielectric for KrF and ArF lasers, according to the preferred embodiment herein, has made it possible, according to experimental results, to increase the energy generated and the mean power by more than 10%, the generating stability parameter (mean square deviation of the generating energy of individual pulses) by a factor of more than two and to increase the service life of the gas mixture by a factor of almost two.

OVERALL LASER SYSTEM

Figure 3:
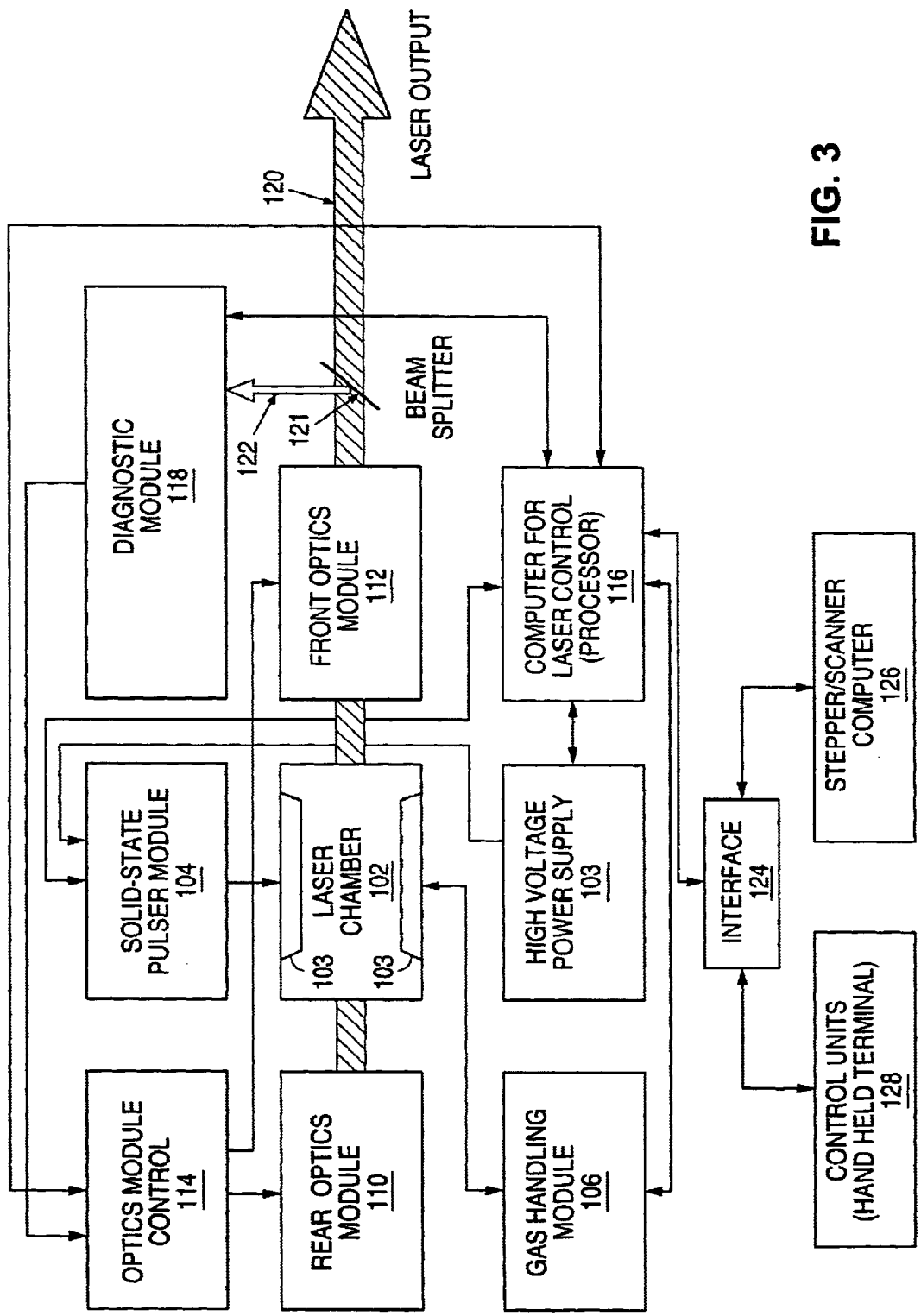
FIG. 3 schematically illustrates an excimer or molecular flourine laser system according to a preferred embodiment.

FIG. 3 schematically illustrates an overall excimier or molecular fluorine laser system according to a preferred embodiment which preferably includes the advantageous features described above with reference to FIGS. 4a–4b. Referring to FIG. 3, a preferred excimer or molecular fluorine laser system is a DUV or VUV laser system, such as a KrF, ArF or molecular fluorine ($F_2$) laser system, for use with a deep ultraviolet (DUV) or vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 3 to meet the requirements of that application. For this purpose, alternative DUV or VUV laser system and component configurations are described at U.S. patent application Ser. Nos. 09/317,695, 09/130,277, 09/244,554, 09/452,353, 09/512,417, 09/599,130, 09/694,246, 09/712,877, 09/574,921, 09/738,849, 09/718,809, 09/629,256, 09/712,367, 09/771,366, 09/715,803, 09/738,849, Nos. 60/202,564, 60/204,095, Ser. Nos. 09/741,465, 09/574,921, 09/734,459, 09/741,465, 09/686,483, 09/584,420, 09/843,604, 09/780,120, 09/792,622, 09/791,431, 09/811,354, 09/838,715, 09/715,803, 09/717,757, 09/771,013, 09/791,430, 09/712,367 and 09/780,124, and U.S. Pat. Nos. 6,005,880, 6,061,382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,212,214, 6,243,405, 6,154,470, and 6,157,662, each of which is assigned to the same assignee as the present application and is hereby incorporated by reference.

DISCHARGE TUBE

The system shown in FIG. 3 generally includes a laser chamber 102 (or laser tube including a heat exchanger and fan for circulating a gas mixture within the chamber 102 or tube) having a pair of main discharge electrodes 103 connected with a solid-state pulser module 104, and a gas handling module 106. The gas handling module 106 has a valve connection to the laser chamber 102 so that halogen, any active rare gases and a buffer gas or buffer gases, and optionally a gas additive, may be injected or filled into the laser chamber, preferably in premixed forms (see U.S. patent application Ser. Nos. 09/513,025, 09/780,120, 09/734,459 and 09/447,882, which is assigned to the same assignee as the present application, and U.S. Pat. Nos. 4,977,573 and 6,157,662, which are each hereby incorporated by reference. The solid-state pulser module 104 is powered by a high voltage power supply 108. A thyratron pulser module may alternatively be used. The laser chamber 102 is surrounded by optics module 110 and optics module 112, forming a resonator. The optics modules 110 and 112 may be controlled by an optics control module 114, or may be alternatively directly controlled by a computer or processor 116, particular when line-narrowing optics are included in one or both of the optics modules 110,112, such as is preferred when KrF, ArF or $F_2$ lasers are used for optical lithography.

PROCESSOR CONTROL

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion 122 of the beam toward the module 118, such as preferably a beam splitter module 121. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126, 128 and/or other external systems.

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor 116 also controls the line narrowing module to tune the wavelength and/or bandwidth or spectral purity, and controls the power supply and pulser module 104 and 108 to control preferably the moving average pulse power or energy, such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 3, the processor 116 preferably communicates with the solid-state or thyratron pulser module 104 and HV power supply 108, separately or in combination, the gas handling module 106, the optics modules 110 and/or 112, the diagnostic module 118, and an interface 124. The laser resonator which surrounds the laser chamber 102 containing the laser gas mixture includes optics module 110 including line-narrowing optics for a line narrowed excimer or molecular fluorine laser, which may be replaced by a high reflectivity mirror or the like in a laser system wherein either line-narrowing is not desired, or if line narrowing is performed at the front optics module 112, or a spectral filter external to the resonator is used for narrowing the linewidth of the output beam.

SOLID STATE PULSER MODULE

The laser chamber 102 contains a laser gas mixture and includes one or more sliding surface preionization units (not shown, but see FIG. 2 and above discussion) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred sliding surface preionization units are set forth above with reference to FIG. 2, and alternative corona and sliding surface preionization arrangements are described at U.S. patent application Ser. Nos. 09/532,276 (sliding surface) and 09/692,265 and 09/247,887 (corona discharge), each of which is assigned to the same assignee as the present application, and additional alternative embodiments are set forth at U.S. Pat. Nos. 5,337,330, 5,818,865, 5,875,207 and 5,991,324, and German Gebraushmuster DE 295 21 572 U1, all of the above patents and patent applications being hereby incorporated by reference.

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply are described above, and further details may be described at U.S. patent application Ser. Nos. 09/640,595, Nos. 60/198,058, 60/204,095, Ser Nos. 09/432,348 and 09/390,146, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

RESONATOR, GENERAL

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described in the 09/715,803 application, wherein the same optic or optics or an additional line-narrowing optic or optics for narrowing the selected line may be used. Also particularly, for the $F_2$-laser and also possibly for other excimer lasers, the total gas mixture pressure may be lower than conventional systems, e.g., lower than 3 bar, for producing the selected line at a narrow bandwidth such as 0.5 pm or less without using additional line-narrowing optics (see U.S. patent application Ser. No. 60/212,301, which is assigned to the same assignee as the present application and is hereby incorporated by reference).

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam or as a highly reflective resonator reflector on the opposite side of the chamber 102 as the beam is outcoupled.

DIAGNOSTIC MODULE

After a portion of the output beam 120 passes the outcoupler of the optics module 112, that output portion preferably impinges upon a beam splitter module 121 which includes optics for deflecting a portion 122 of the beam to the diagnostic module 118, or otherwise allowing a small portion 122 of the outcoupled beam to reach the diagnostic module 118, while a main beam portion 120 is allowed to continue as the output beam 120 of the laser system (see U.S. patent application Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam prior to detection.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module 121 is the output beam 120 of the laser, which propagates toward an industrial or experimental application such as an imaging system and workpiece for photolithographic applications.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 121 to control the intensity, spectral distribution and/or other parameters of the radiation impinging upon the detector (see U.S. patent application Ser. Nos. 09/172,805, 09/741,465, 09/712,877, 09/771,013 and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer (see U.S. patent application Ser. Nos. 09/416,344, 09/686,483, and Ser. No. 09/791,431, each of which is assigned to the same assignee as the present application, and U.S. Pat. Nos.

4,905,243, 5,978,391, 5,450,207, 4,926,428, 5,748,346, 5,025,445, 6,160,832, 6,160,831 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 116 and optics control modules 110, 112, gas handling module 106, power supply and pulser modules 103, 104, or other laser system component modules. For example, the total pressure of the gas mixture in the laser tube 102 may be controlled to a particular value for producing an output beam at a particular bandwidth and/or energy.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

BEAM PATH ENCLOSURE

Particularly for the molecular fluorine laser system, and for the ArF laser system, an enclosure (not shown) preferably seals the beam path of the beam 120 such as to keep the beam path free of photoabsorbing species. Smaller enclosures preferably seal the beam path between the chamber 102 and the optics modules 110 and 112 and between the beam splitter 122 and the diagnostic module 118. The optics modules 110 and 112 are maintained in an atmosphere that is sufficiently evacuated or have an inert gas purged atmosphere. Preferred enclosures are described in detail in U.S. patent application Ser. Nos. 09/598,552, 09/594,892, 09/727,600, 09/317,695 and 09/131,580, which are assigned to the same assignee and are hereby incorporated by reference, and U.S. Pat. Nos. 6,219,368, 5,559,584, 5,221, 823, 5,763,855, 5,811,753 and 4,616,908, all of which are hereby incorporated by reference.

GAS MIXTURE

The laser gas mixture is initially filled into the laser chamber 102 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent application Ser. Nos. 09/513, 025, 09/447,882, and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the 09/513,025 application incorporated by reference above. Specifically, for the F2-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

GAS REPLENISHMENT

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 106 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977, 573, 6,212,214, 6,243,406 and 5,396,514 and U.S. patent application Ser. Nos. 09/447,882, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the 09/734,459 application, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1% $F_2$:99% Ne or other buffer gas such as He, and another gas line for injecting a premix B including 1% rare gas: 99% buffer gas, for a rare gas-halide excimer laser, wherein for a $F_2$ laser premix B is not used. Another line may be used for injecting a gas additive or gas additive premix, or a gas additive may be added to premix A, premix B or a buffer gas. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 102 via the valve assembly, the fluorine concentration in the laser tube 102 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, or more depending on the degree of stability desired, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

LINE NARROWING

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). These exemplary embodiments may be used for selecting the primary line $\lambda_1$ only, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application Ser. No. 60/212,301, which is assigned to the same assignee and is hereby incorporated by reference). Line-selection and/or line-narrowing is also further described above with reference to FIGS. 4a and 4b.

Exemplary line-narrowing optics contained in the optics module 110 include a beam expander, an optional interferometric device such as an etalon or a device having a pair of opposed non-planar reflection plates such as may be described in the 09/715,803 or 60/280,398 applications, which are assigned to the same assignee as the present application and are hereby incorporated by reference, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the 09/715,803, 09/738,849, and 09/718,809 applications, each being assigned to the same assignee and hereby incorporated by reference.

Instead of having a retro-reflective grating in the rear optics module 110, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 110. In the case of using an all-reflective imaging system, the laser may be configured for semi-narrow band operation such as having an output beam linewidth in excess of 0.5 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the 09/771,366 application and the 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

ADDITIONAL LASER SYSTEM FEATURES

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 116, and initiating realignment, gas pressure adjustments in the modules 110, 112, or reconfiguration procedures (see the '353, '695, '277, '554, and '527 applications mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 102 following a new fill procedure. In addition, gas injection actions such as $\mu$ HIs as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler is preferably one that is highly transparent at wavelengths below 200 nm, such as at the 157 nm output emission wavelength of the molecular fluorine laser. The materials are also capable of withstanding long-term exposure to ultraviolet light with minimal degradation effects. Examples of such materials are $CaF_2$, $MgF_2$, BaF2, LiF and $SrF_2$, and in some cases fluorine-doped quartz may be used. Also, in all of the embodiments, many optical surfaces, particularly those of the prisms, may or may not have an anti-reflective coating on one or more optical surfaces, in order to minimize reflection losses and prolong their lifetime.

Also, the gas composition for the excimer or molecular fluorine laser in the above configurations uses either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent application Ser. Nos. 09/599,130 and No. 60/228,184, which are assigned to the same assignee and are hereby incorporated by reference. The amplifier may be the same or a separate discharge chamber 102. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. An excimer or molecular fluorine laser, comprising:
   a discharge chamber filled with a gas mixture at least including a halogen-containing species and a buffer gas;
   a pair of elongated main discharge electrodes within the discharge chamber for forming a discharge therebetween;
   a sliding surface preionization unit within the discharge chamber including an elongated dielectric plate;
   a discharge circuit for supplying electrical pulses to said main discharge electrodes to energize the gas mixture, the discharge circuit further including multiple peaking capacitors connected between the main discharge electrodes and having a main discharge peaking capacitance, the sliding surface preionization unit being connected between a main discharge electrode and one or more of the multiple peaking capacitors, the one or more peaking capacitors connected to the sliding surface preionization unit having a preionization capacitance that is less than said main discharge peaking capacitance; and
   a resonator for generating a laser beam.

2. The laser of claim 1, wherein the dielectric plate is oriented with a cross-sectional long axis between substantially 30° and 90° relative to a direction of the discharge.

3. The laser of claim 1, wherein the dielectric plate is oriented with a cross-sectional long axis at an angle relative to a direction of the discharge not less than an angle between the direction of the discharge and a gas flow direction of gas entering a discharge region between the main discharge electrodes.

4. The laser of claim 1, wherein the dielectric plate is oriented with a cross-sectional long axis substantially perpendicular to a direction of the discharge.

5. The laser of claim 1, wherein the dielectric plate is disposed adjacent to one of the main discharge electrodes.

6. The laser of claim 1, wherein the dielectric plate is disposed proximate to one of the main discharge electrodes.

7. The laser of claim 6, wherein the dielectric plate is mechanically contacting said one of said main discharge electrodes.

8. The laser of claim 1, wherein the dielectric plate is oriented with a cross sectional long axis at an angle to a direction of the discharge.

9. The laser of claim 8, wherein said dielectric plate has an end disposed proximate to one of the main discharge electrodes.

10. The laser of claim 9, wherein one end of the plate is mechanically contacting one of the main discharge electrodes.

11. The laser of claim 10, wherein said angle is substantially 90°.

12. The laser of claim 1, wherein said one or more peaking capacitors that are connected to the sliding surface preionization unit include one or more capacitors of a different size than peaking capacitors of the multiple peaking capacitors providing the main discharge peaking capacitance.

13. The laser of claim 1, wherein said peaking capacitors providing said main discharge peaking capacitance include said one or more peaking capacitors connected to said sliding surface preionization unit.

* * * * *